US011055383B2

(12) United States Patent
Dimerman

(10) Patent No.: US 11,055,383 B2
(45) Date of Patent: Jul. 6, 2021

(54) AUTOMATICALLY IDENTIFYING RISK IN CONTRACT NEGOTIATIONS USING GRAPHICAL TIME CURVES OF CONTRACT HISTORY AND DIVERGENCE

(71) Applicant: Coupa Software Incorporated, San Mateo, CA (US)

(72) Inventor: Dan Dimerman, Vancouver (CA)

(73) Assignee: Coupa Software Incorporated, San Mateo, CA (US)

( * ) Notice: Subject to any disclaimer, the term of this patent is extended or adjusted under 35 U.S.C. 154(b) by 260 days.

(21) Appl. No.: 15/807,436

(22) Filed: Nov. 8, 2017

(65) Prior Publication Data

US 2019/0138571 A1 May 9, 2019

(51) Int. Cl.
*G06F 17/18* (2006.01)
*G06Q 10/06* (2012.01)
(Continued)

(52) U.S. Cl.
CPC ............ *G06F 17/18* (2013.01); *G06F 16/248* (2019.01); *G06F 16/2477* (2019.01);
(Continued)

(58) Field of Classification Search
CPC ........................... G06F 17/18; G06Q 10/0635
See application file for complete search history.

(56) References Cited

U.S. PATENT DOCUMENTS

| 2003/0083897 A1* | 5/2003 | Baldwin | ............ | G06Q 10/0631 705/7.12 |
| 2003/0177083 A1* | 9/2003 | Mont | ..................... | G06Q 40/08 705/36 R |

(Continued)

FOREIGN PATENT DOCUMENTS

| GB | 2529172 A | * | 2/2016 | ........... G06F 40/197 |
| WO | WO-013584 | * | 5/2001 | ............. G06Q 30/06 |
| WO | WO-0135284 A1 | * | 5/2001 | ............. G06Q 30/06 |

OTHER PUBLICATIONS

Benjamin Bach, Conglei Shi, Nicolas Heulot, Tara Madhyastha, Tom Grabowski, Time Curves: Folding Time to Visualize Patterns of Temporal Evolution Data, 2015, Institute of Electrical and Electronics Engineers, 22(1) (Year: 2015).*

(Continued)

*Primary Examiner* — Brian M Epstein
*Assistant Examiner* — Kristin E Gavin
(74) *Attorney, Agent, or Firm* — Baker Botts L.L.P.

(57) ABSTRACT

In one embodiment, a method includes storing digital data representing a contract set of contract documents, storing digital contract metadata identifying data fields and associated data types with respectively assigned weights in each contract document, identifying and weighting differences between data field values, calculating distance scores based on the weighted differences, generating and causing displaying a time curve graph based on the distance scores and a temporal ordering of the contract documents, the time curve graph including a geometric shape that graphically indicates time curves and a spatial proximity between the contract documents, performing a digital geometric analysis of the time curve graph to identify whether the geometric shape indicates a lack of convergence over a threshold amount of time, in response to determining that the geometric shape indicates the lack of convergence, generating and causing displaying a notification indicating that the contract set is at risk.

14 Claims, 7 Drawing Sheets

(51) Int. Cl.
  *G06T 11/20* (2006.01)
  *G06F 16/248* (2019.01)
  *G06F 16/2458* (2019.01)
  *G06F 16/332* (2019.01)

(52) U.S. Cl.
  CPC ..... *G06F 16/3323* (2019.01); *G06Q 10/0635* (2013.01); *G06T 11/206* (2013.01)

(56) References Cited

U.S. PATENT DOCUMENTS

| | | | | |
|---|---|---|---|---|
| 2009/0048927 | A1* | 2/2009 | Gross | G06Q 30/00 705/14.42 |
| 2013/0191238 | A1* | 7/2013 | Ozonat | G06Q 30/06 705/26.4 |
| 2014/0019368 | A1* | 1/2014 | Noh | G06Q 50/188 705/80 |
| 2016/0364675 | A1* | 12/2016 | Sharma | G06Q 10/1097 |

OTHER PUBLICATIONS

Bach, Benjamin, Conglei Shi, Nicolas Heulot, Tara Madhyastha, Tom Grabowski, and Pierre Dragicevic. "Time curves: Folding time to visualize patterns of temporal evolution in data." IEEE transactions on visualization and computer graphics 22, No. 1: 559-568, Nov. 29, 2016.

* cited by examiner

FIG. 2

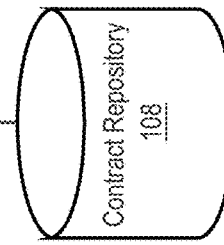

Contract Repository
108

CONTRACT FOR THE SALE OF GOODS

This contract for the sale of goods is between Buyer and Seller. The parties agree as follows:

1. Sale of Goods. The Seller shall sell to the Buyer and the Buyer shall purchase from the Seller the goods set forth in section (the "Goods") in the prices stated in section 3. Unless otherwise stated, the Buyer shall pay all taxes and third-party expenses imposed on, in connection with, or measured by the transaction contemplated by this agreement in addition to the prices set forth in section 3.

2. Invoices; Payment. Unless otherwise stated in this document, payment for the Goods is due within 30 days of the date of the Seller's invoice, which date will not be before the date of the Seller's delivery of the Goods. The Buyer shall pay a delinquency charge of the lesser of (1) 1% per month and (2) the highest rate allowed under applicable law on all overdue amounts until the amounts are paid.

3. Price. Seller agrees to deliver the goods at a price of $1,000,000.

_____
Buyer Signature

_____
Seller Signature

Date: 10/18/18

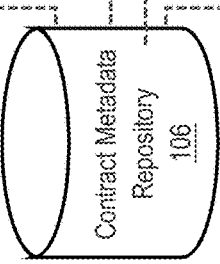

Contract Metadata Repository
106

AUTOMATICALLY IDENTIFYING RISK IN CONTRACT NEGOTIATIONS USING GRAPHICAL TIME CURVES OF CONTRACT HISTORY AND DIVERGENCE

FIELD OF THE DISCLOSURE

The present disclosure generally relates to the technical field of statistical analysis of data using digital computers. The disclosure relates more specifically to the technical field of efficient algorithms for computer systems that are programmed to automatically generate a risk analysis of a set of contract documents based on identifying patterns of geometric shapes in a time curve graph of contract history and divergence.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Business enterprises enter contractual agreements in all stages of business. Contractual agreements can provide individuals and businesses with a legal document stating the expectations of both parties and how negative situations will be resolved and may exist between different business enterprises or may exist internally within a business organization.

The formation of a contractual agreement typically involves a negotiation process between the parties involved in forming the agreement. In doing so, business enterprises will begin contract negotiations with a contract template that includes basic contractual clauses and provisions that provide a starting point for negotiations to begin.

As the contract negotiation process progresses, each party of the negotiation may provide edits to the contract documents that result in different versions of the original contract template. For example, one party may delete an entire contractual clause, where another party may change a price amount specified in the contractual agreement. The back and forth negotiation sequence between contractual parties normally continues until an agreement is reached between all parties involved or no agreement can be reached.

At any point during the negotiation process, a business enterprise may have hundreds of pending contracts to monitor and manage. Keeping track of differences between contract versions is typically a manual process where an employee or third party will go through each contract version and document the modifications made to each version so that the contract manager is able to understand the current state of the contract. This manual process results in exorbitant amounts of time and computing resources that are devoted to helping an employee manually accomplish this feat.

Based on the foregoing, there is a need to understand the state of many contracts in a small amount of time.

SUMMARY

The appended claims may serve as a summary of the invention.

BRIEF DESCRIPTION OF THE DRAWINGS

In the drawings:

FIG. 2 illustrates a contract document with associated digital contract metadata.

DETAILED DESCRIPTION

Figure 1:
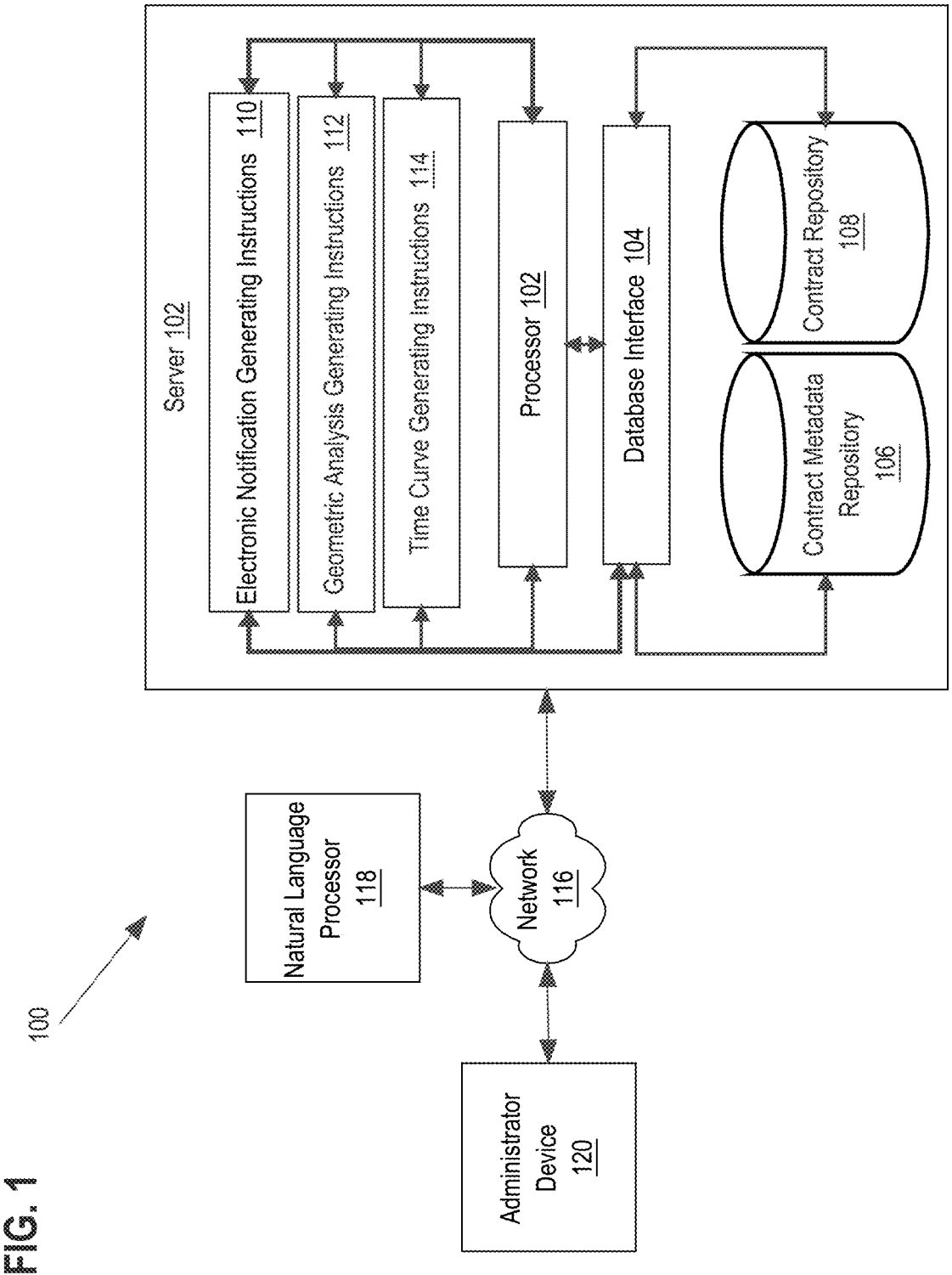
FIG. 1 illustrates an example computer system with which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

Embodiments are described in sections according to the following outline:

1.0 GENERAL OVERVIEW
2.0 EXAMPLE NETWORKED COMPUTER SYSTEM
3.0 EXAMPLE ALGORITHMS AND METHODS
4.0 HARDWARE OVERVIEW
5.0 OTHER ASPECTS OF DISCLOSURE 1.0 General Overview In various embodiments, methods and computer systems are provided that are programmed or configured to automatically identify risk in contract negotiations using time curves of contract history and convergence.

In one embodiment, a computer-implemented method comprises storing, in one or more data repositories, digital data representing a contract set of two or more contract documents comprising a template document and one or more contract document versions based on the template document; storing, in one or more data repositories, digital contract metadata, the digital contract metadata including data identifying one or more data fields in each contract document of the contract set, data specifying the data type of the one or more data fields in each contract document of the contract set, and weights assigned to each data type; generating and causing displaying, at a computer associated with a contract administrator, a time curve graph based on the contract set and contract metadata, the time curve graph graphically indicating similarities between contract documents in the contract set and a temporal ordering of contract documents in the contract set; determining whether the contract set is at risk by performing a digital geometric analysis of the time curve graph to identify one or more geometric shapes that indicate that the contract set is at risk; in response to determining that the contract set is at risk, generating and causing displaying, at a computer associated with the contract administrator, a notification indicating that the contract set is at risk.

In another embodiment, a computer-implemented method comprises storing, in one or more data repositories, a first contract set, the first contract set comprising two or more contract documents, the two or more contract documents comprising a template document and one or more contract document versions based on the template document; storing, in one or more data repositories, a second contract set, the second contract set comprising two or more contract documents, the two or more contract documents comprising the template document and one or more contract document versions based on the template document; storing, in one or more data repositories, contract metadata, the contract metadata including data regarding one or more data fields in each contract document of the first and second contract sets, data specifying the data type of the one or more data fields in each contract document of the first and second contract sets, and weights assigned to each data type; generating and causing displaying, at a computer associated with a contract administrator, a time curve graph based on the first contract set, the second contract set, and the contract metadata, the time curve graph graphically indicating similarities between contract documents in the first contract set, similarities between contract documents in the second contract set, and a temporal ordering of contract documents in each contract set of the first and second contract sets; determining whether the template document of the contract set needs to be modified by performing a geometric analysis of the time curve graph to identify a geometric trend between the first and second contract sets that indicate that the template document should be modified; in response to identifying a directional trend between the first and second contract sets that indicate that the template document should be modified, generating and causing displaying, at a computer associated with the contract administrator, a notification indicating that the template document should be modified.

2.0 Example Networked Computer System

FIG. 1 illustrates an example computer system that may be used to implement an embodiment.

In an embodiment, a computer system 100 comprises a server computer ("server" for short) 102, administrator device 120, and a natural language processor 102, which are communicatively coupled directly or indirectly via network 116. Network 116 comprises one or more data networks including any of local area networks, wide area networks, internetworks or internets.

In one embodiment, a server 102 comprises a processor 102, electronic notification generating instructions 110, geometric analysis generating instructions 112, time curve generating instructions 114, and database interface 104. Processor 102 broadly represents one or more hardware processors such as central processing units, processor cores, or processor modules, with associated support circuitry such as memory management circuits, I/O circuits, display drivers, and the like. Each of the electronic notification generating instructions 110, geometric analysis generating instructions 112, and time curve generating instructions 114 represent regions in main memory, such as RAM, coupled to and accessible by the processor 102, and programmed with machine executable instructions that are configured to perform the functions described herein when executed using the processor 102.

Although the electronic notification generating instructions 110, geometric analysis generating instructions 112, and time curve generating instructions 114 are shown in FIG. 1 as executing on the server 102, the electronic notification generating instructions 110, geometric analysis generating instructions 112, and time curve generating instructions 114 may be a part of computer instructions installed as part of a separate system, as a module or a plug-in to supplement features of the server 102, as a separate instance of executing code on the server 102, or any other arrangement depending on the needs of an administrator device 120.

The server 102 may generate and transmit alerts, messages, notifications, and other information generated by the electronic notification generating instructions 110 to the administrator device 120 over the network 116.

The database interface 104 is coupled to a contract metadata repository 106 and a contract repository 108. In this context, "database" may refer to a relational database, flat file, table, spreadsheet, or any other form of collective data storage that is capable of programmatic interrogation, such as using a query or API call, to obtain a result set of one or more records or datasets.

In an embodiment, contract repository 108 stores digital data representing contract documents. A contract document is an electronic document that specifies terms of a contractual agreement. A contract document may exist within a contract set, which may include one or more contract documents. A contract set may include a template document, which may be the first version of a series of contract document versions. A contract document version may be a revised document version of a template document.

In one embodiment, contract metadata repository 106 stores digital metadata associated with contract documents. Digital contract metadata may associate selections of text in a contract document with data fields and data field values. As shown in FIG. 2, contract metadata may identify a date field from a contract document as the textual selection "Date: 10/18/18", or a monetary value field from the contract document, such as the text selection "$1,000,000". Digital contract metadata stored in the contract metadata repository 106 may be used for implementing aspects of the flow diagrams that are further described herein.

The digital metadata associated with contract documents stored in the contract metadata repository may store data that provides information regarding one or more data fields in one or more contract documents, data specifying the data type of the one or more data fields in one or more contract documents, weights assigned to each data type of a contract document, temporal data indicating the temporal ordering of contract documents in a contract set, and a contract clause library.

Although the contract metadata repository 106 and contract repository 108 are shown in FIG. 1 as encompassed by the server 102, the contract metadata repository 106 and contract repository 108 may exist separately from the server 102, and accordingly accessed via network 116.

The natural language processor 118 may be accessed via network 116 by the server 102. The natural language processor 118 may process contracts sets to calculate metrics indicating how different two contract versions are from each other. The contract server may retrieve data from the contract repository 108 and the contract metadata repository 106 and send the data via network 116 to the natural language processor 118. Data from the natural language processor 118 may be used as input to any of the electronic notification generating instructions 110, geometric analysis generating instructions 112, and time curve generating instructions 114. Although there is one natural language processor 118 shown in FIG. 1, any other number of natural language processors may be accessed by the server at any given time.

Although the natural language processor 118 is shown in FIG. 1 as existing separately from the server, the natural language processor 118 may exist natively on the server 102, and accordingly accessed via processor 102.

Administrator device 120 broadly represents any computing device that is separate from the server 102, such as a laptop computer, desktop computer, tablet computer, smartphone, workstation, or other computer, and that is associated with a server administrator who may specify parameters or preset values for any of the programmable instructions 112, 114, 116, 118, 120.

The electronic notification generating instructions 110 may be programmed or configured to generate alerts, notifications, messages, and other information. For example, the electronic notification generating instructions 110 may include features to communicate with the time curve generating instructions 114, geometric analysis generating instructions 112, the server 102, administrator device 120, any third-party API via the network 116, and database interface 104. The electronic notification generating instructions 110 may also be used for implementing aspects of the flow diagrams that are further described herein.

The geometric analysis generating instructions 112 may be programmed or configured to analyze time curve graphs to identify different shapes that exist within the time curve graphs and associate identified shapes with contract set risk values. Additionally, the geometric analysis generating instructions 112 may include features to communicate with the electronic notification generating instructions 110, time curve generating instructions 114, the server 102, administrator device 120, and any third-party API via the network 116, and database interface 104. The geometric analysis generating instructions 112 may also be used for implementing aspects of the flow diagrams that are further described herein.

The time curve generating instructions 114 may be programmed or configured to generate a time curve graph such as shown in FIG. 3. A time curve graph is a graphical representation of one or more time curves, as described herein. For example, the time curve generating instructions 114 may include features to communicate with the geometric analysis generating instructions 112, electronic notification generating instructions 110, the server 102, administrator device 120 via the network 116, and database interface 104. The time curve generating instructions 114 may also be used for implementing aspects of the flow diagrams that are further described herein.

Network 116 may be implemented by any medium or mechanism that provides for the exchange of data between the various elements of FIG. 1. Examples of network 116 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 116 is shown as a single element but in practice, network 11 may comprise one or more local area networks, wide area networks, and/or internetworks. The various elements of FIG. 1 may also have direct (wired or wireless) communications links, depending upon a particular implementation.

For purposes of illustrating a clear example, FIG. 1 illustrates a single client device 124, a single processor 102, and single instances of certain other elements. Other embodiments may implement any number of such elements. For example, the server 102 may be deployed as two or more computers, clusters, containers, and/or virtual machine instances in one or more physical or virtual machines that are co-located, separate, and/or located in shared computing facilities such as cloud computing datacenters.

3.0 Example Algorithms and Methods
3.1 Overview

Figure 5:
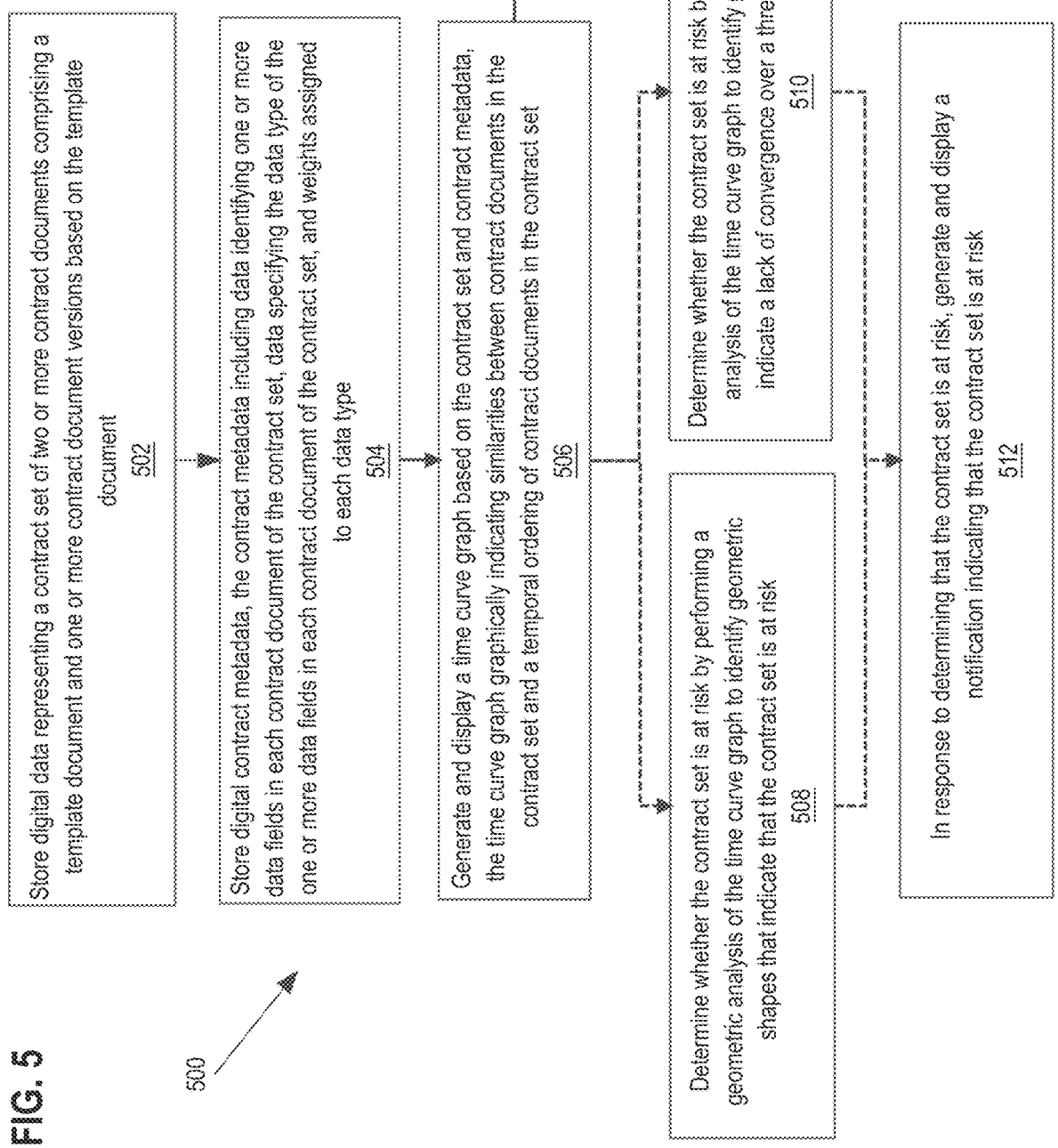
FIG. 5 illustrates an example algorithm or method of automatically identifying risk in contract negotiations using a time curve graph.

FIG. 5 is a flowchart of an example method of providing offers based on predictive shopping patterns, according to various embodiments.

For purposes of illustrating a clear example, FIG. 5 is described herein in the context of FIG. 1, but the broad principles of FIG. 5 can be applied to other systems having configurations other than as shown in FIG. 1. Further, FIG. 5 and each other flow diagram herein illustrates an algorithm or method that may be used as a basis for programming one or more of the functional modules of FIG. 1 that relate to the functions that are illustrated in the diagram, using a programming development environment or programming language that is deemed suitable for the task. Thus, FIG. 5 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

In step 502, digital data is stored representing a contract set of two or more contract documents. The two or more contract documents may comprise a template document and one or more contract document versions based on the template document. For example, the digital data representing contract documents may be stored in the contract repository 108 by the server 102. The server 102 may receive digital contract data from any external source via the network 116 and store the digital data in the contract repository 108. Digital contract data may also be generated internally by the server 102 and stored, by the server 102, in the contract repository 108.

In step 504, digital contract metadata is stored, the contract metadata including data identifying one or more data fields in each contract document of the contract set, data specifying the data type of the one or more data fields in each contract document of the contract set, and weights assigned to each data type. For example, digital contract metadata may be stored in the contract metadata repository 106 by the server 102. The server 102 may receive digital contract metadata from any external source via network 116 and store the digital contract metadata in the contract metadata repository 106. Contract metadata may also be generated internally by the server 102 and stored, by the server 102, in the contract metadata repository 106.

For example, FIG. 2 shows a contract document with associated digital contract metadata. The digital contract metadata from contract metadata repository 106 associates selections of text from the contract document with data fields and data field values. For example, the digital contract metadata associates the selection of text: "Date: 10/18/18" from the contract document as a 'Date' datatype having a value of '10/18/18'. The digital contract metadata associates the selection of text: "$1,000,000" from the contract document as a 'Monetary Value' datatype having a value of '1,000,000. The digital contract metadata associates the selection of text: "30 days" from the contract document as a 'Time Value' datatype having a value of '30.

In an embodiment, contract metadata may include a contract clause library and data identifying the frequency of occurrence of each data type in each contract document of the contract set. A contract clause library may identify a selection of text from a contract document as a contract clause. The digital contract metadata may include a contract clause as a datatype. A contract clause may be defined as a generic 'Contract Clause' datatype, or each contract clause may be specified as a unique data type. For example, a 'Sale of Goods' contract clause, such as the contract clause shown in FIG. 2 may be defined by the contract metadata as a 'Contract Clause' datatype, or a 'Sale of Goods Contract Clause' datatype. A contract clause library may include weights assigned to each contract clause type that is included in the contract clause library.

In an embodiment, the digital contract metadata includes temporal data indicating a temporal ordering of the contract documents in the contract set. For example, temporal data may include timestamp values associated with each contract document of a contract set that indicates a date when each contract document was last modified.

In step 506, a time curve graph is generated and displayed based on the contract set and contract metadata, the time curve graph graphically indicating similarities between contract documents in the contract set and a temporal ordering of contract documents in the contract set. For example, the time curve generating instructions 114 may retrieve the digital contract metadata from the contract metadata repository 106 via the database interface 104 and a set of contract documents from the contract repository 106 via the database interface 104 and generate a time curve graph based on the digital contract metadata and set of contract documents.

In general, time curve graphs are used for visualizing patterns of evolution in temporal data. The time curve technique is a generic approach for visualizing temporal data based on self-similarity. The time curve graph assumes that the underlying information artefact, such as contract document versions in a contract set, can be broken down into discrete time points, and that the similarity between any two time points can be quantified through a meaningful metric.

Figures 3A, 3B:
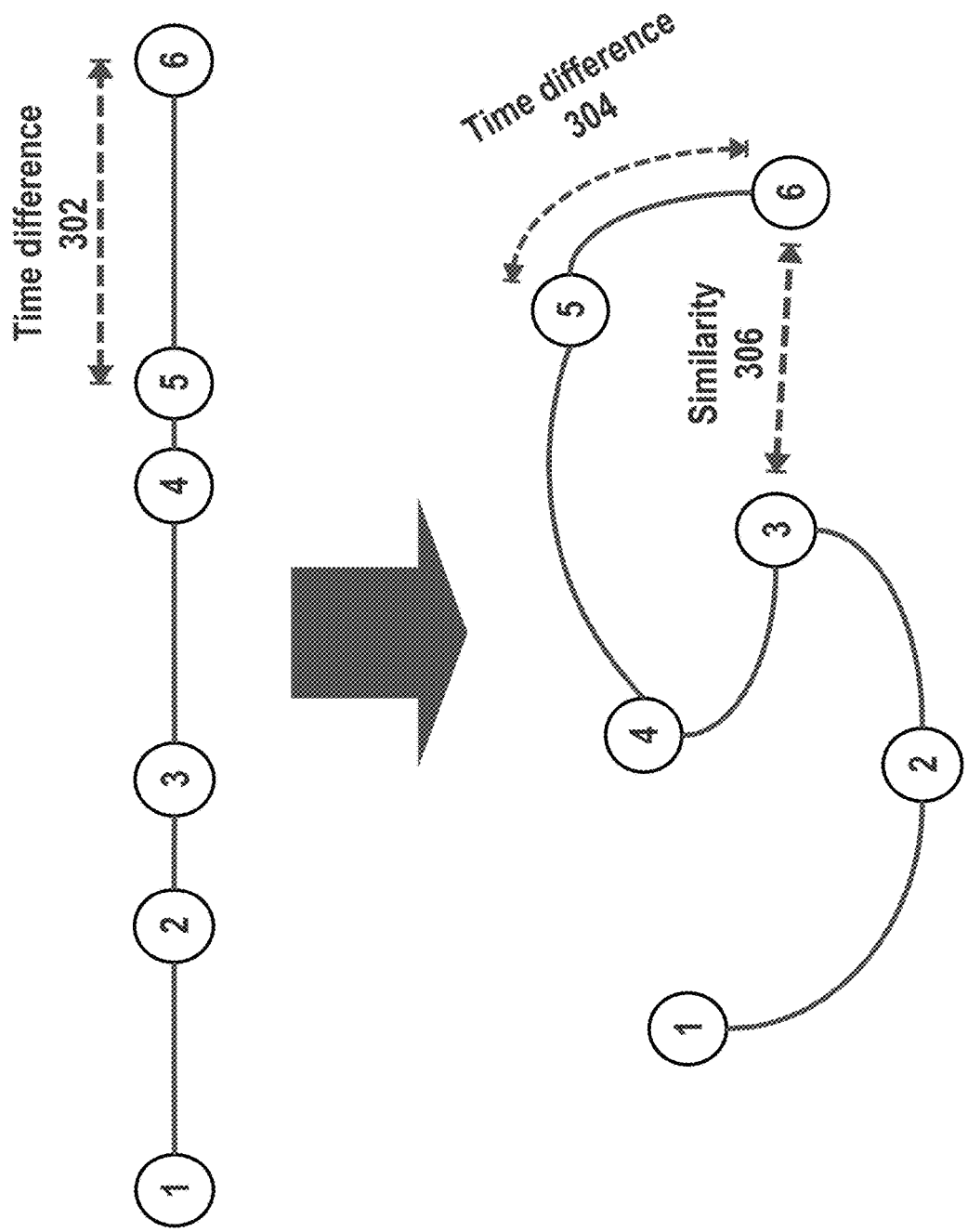
FIG. 3A and FIG. 3B illustrate the generation of a time curve.

For example, FIG. 3A shows a timeline of different document versions of a contract set over time. Document '1' denotes the first document version on the timeline while document '6' denotes the last document version on the timeline. Although the timeline provides useful information regarding the temporal ordering of contract document versions, such as the time difference between contract versions 302, the timeline provides no indication of how similar any two documents may be with respect to each other. For example, document '6' may be nearly identical to document '1' after revisions 2-6, but the timeline provides no indication of this similarity.

The timeline can be folded to generate a time curve that graphically indicates how similar two contract documents are to each other. FIG. 3B shows a folded timeline, referred to as a time curve, that provides a visual indication of how similar two contract documents are to one another 306 while also providing an indication of temporal ordering of the contract documents.

For example, the measure of each curve between contract versions provides a metric of time difference 304, such as the amount of time between the creation of two contract document versions. The spatial proximity between contract document versions provides a metric of similarly 306, such as how similar two contract versions are to each other.

Figure 6:
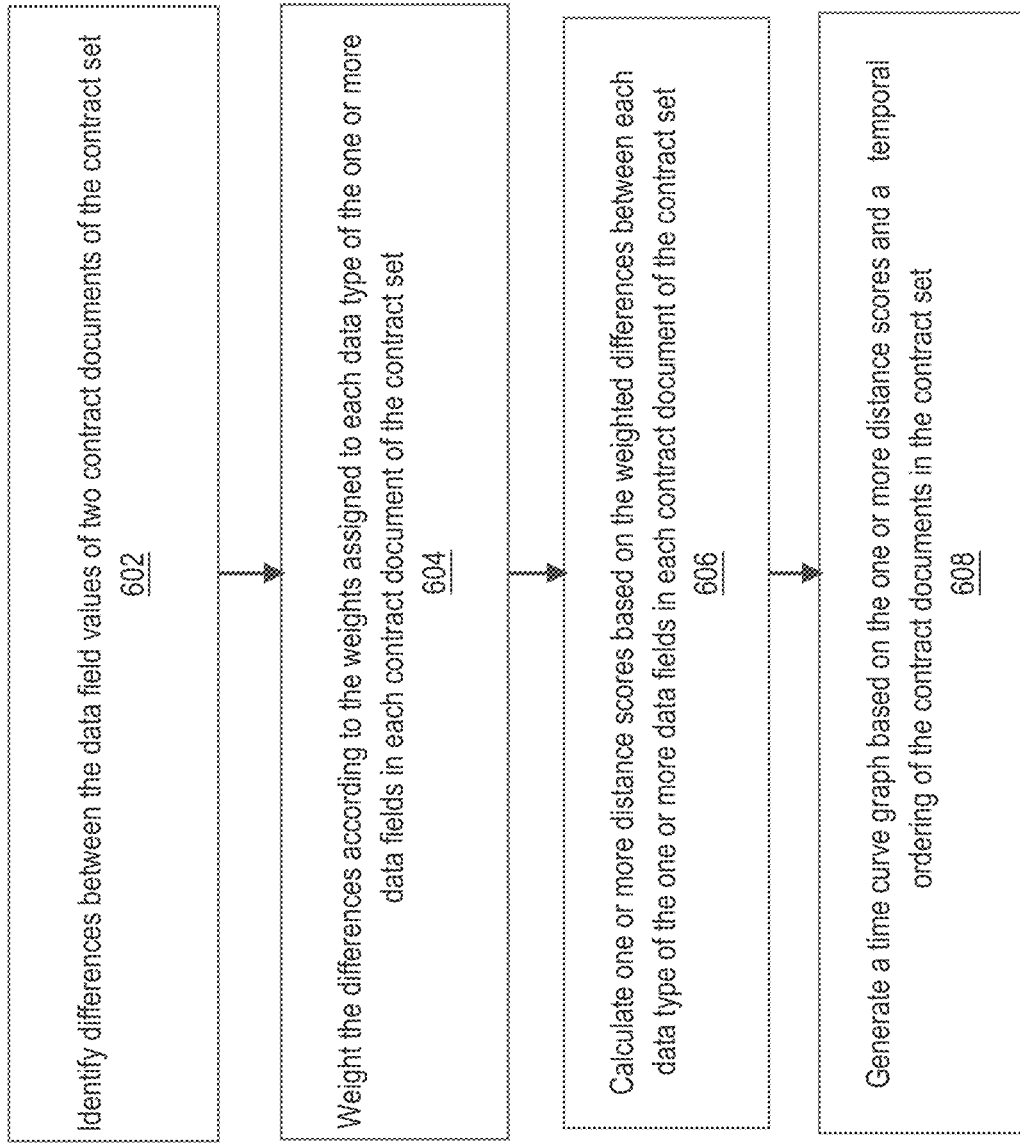
FIG. 6 illustrates an example algorithm or method of generating a time curve graph for a contract set.

An example of generating a time curve by the time curve graph generating instructions is illustrated in detail by flow 600 of FIG. 6.

Referring now to FIG. 6, in step 602, differences between the data field values of two contract documents of the contract set are identified. For example, the time curve graph generating instructions may identify that a data field specified by the digital contract metadata has a different value in two contract document versions of the contract set. Each contract document version of a contract set may have different values assigned to the same field. For example, from FIG. 2, the specific data field with the 'Monetary Value' datatype may exist in every contract document version of a contract set, but the value of the specific data field may change between different contract document versions. For example, in a first contract document of a contract set, the data field value may be '1,000,000', as shown in FIG. 2. In a second contract document of a contract set, the data field value may be '1,000'. Differences between the data field values of different contract documents in a contract set may be identified for every possible combination of two different contract document versions of the contract set.

In step 604, the identified differences are weighted according to the weights assigned to each data type of the one or more data fields in each contract document of the contract set. For example, the time curve graph generating instructions may weight the identified differences based on the weights associated with the respective data field type from the digital contract metadata. For example, from FIG. 2, the data field with the 'Monetary Value' datatype may be associated with a weight of 10. The data field with the 'Date' datatype may be associated with a weight of 2.

In general, higher weights are associated with data types or data fields that have a higher degree of impact on the contract document. For example, an identified difference between a first contract document with a 'Monetary Value' data type and corresponding data field value of '1,000,000' and a second contract document with the same 'Monetary Value' data type and different corresponding data field value of '100,000' are weighted much higher than a difference between a 'Date' data type with corresponding data field value because a change in the data field value for a 'Monetary Value' data type has a more significant impact on the state of the contract set than a 'Date' data type.

In step 606, one or more distance scores are calculated based on the weighted differences between each data type of the one or more data fields in each contract document of the contract set. For example, the time curve graph generating instructions may calculate one or more distance score metrics based on the weighted differences between the contract documents.

In an embodiment, a distance score comprises a metric that quantifies how similar two contract documents are to each other.

In an embodiment, a calculating a distance score includes identifying differences between two contract documents of a contract set using natural language processing.

Figure 4:
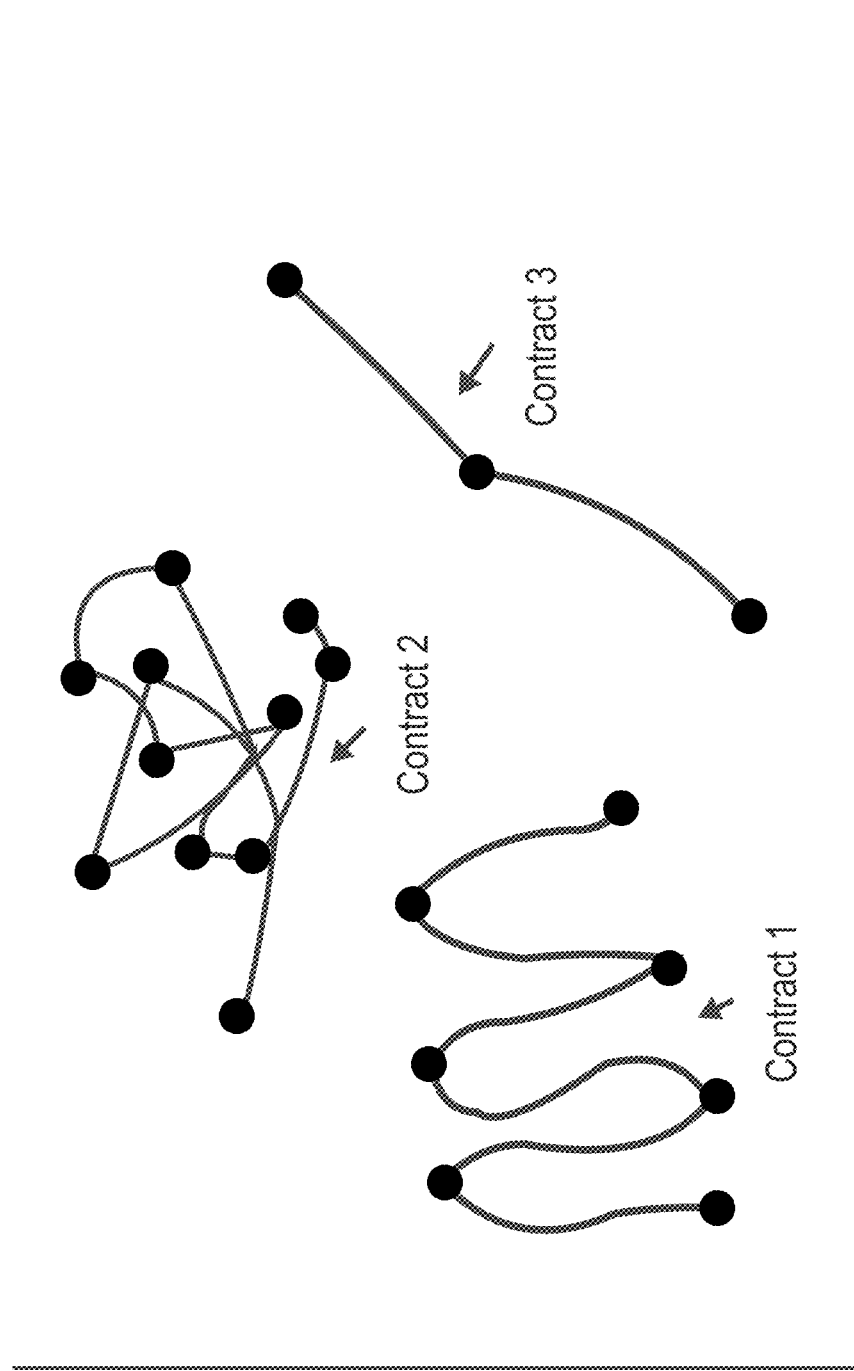
FIG. 4 illustrates an example time curve graph.

In step 608, a time curve graph is generated based on the one or more distance scores and a temporal ordering of the contract documents in the contract set. For example, the time curve graph generating instructions may generate a time curve graph based on the calculated one or more distance scores and a temporal ordering of the contract documents in the contract set. FIG. 4 shows a time curve graph where each of the three different contract sets represent a different time curve.

In an embodiment, a time curve graph comprises a three-dimensional graph, a two-dimensional graph, a one-dimensional graph, or a zero-dimensional graph. A zero-dimensional graph may comprise metrics that indicate the convergence of one or more contract sets.

Referring now to FIG. 5, in step 508, it is determined whether the contract set is at risk by performing a geometric analysis of the time curve graph to identify geometric shapes that indicate that the contract set is at risk. For example, the geometric analysis generating instructions 112 may perform a geometric analysis of the time curve graph that is received as input from the time curve graph generating instructions and determine whether the time curves of the time curve graph identify as certain geometric shapes.

Each time curve may be identified as a geometric shape. Geometric characteristics of a time curve can convey information regarding the progress of the contract set. For example, a straight or smooth curve may indicate progression in contract negotiations, whereas a curve that does not exhibit any long-term change in location is indicative of a stagnating negotiation process. A curve with no oscillation may suggest a stable process, while a high degree of oscillation may suggest a process that is unstable or risky.

A time curve with many self-intersections may indicate an ineffective negotiation process. Point density refers to the ratio between the number of time points along a curve and the curve's length. High density indicates a series of small changes, while low density indicates few major changes. Variations in density may indicate either a change in the speed of the negotiation process. Regular curves have predictable characteristics, e.g., an oscillation of fixed periodicity and amplitude, or consistent changes in point density, and thus suggest lawful processes. Irregular curves are unpredictable and suggest chaotic, risky negotiation processes and/or resulting risky contract document versions.

In an embodiment, the geometric analysis generating instructions 112 may associate a geometric shape with a contract set risk value. The administrator device 120 may specify geometric shapes and associated risk values. Geometric shapes and associated risk values may also be specified by default values in the geometric analysis generating instructions 112. For example, the administrator device 120 may specify that a straight-line shape is associated with a low risk value while a divergent shape is associated with a high-risk value.

For example, the geometric analysis generating instructions 112 may geometrically analyze the time curve graph of FIG. 4 to identify that Contract 1 resembles an oscillating shape and then determine that Contract 1 is unstable or risky based on the identified oscillating shape being associated with a lack of progress is contract negotiations and the associated high-risk value. The geometric analysis generating instructions 112 may identify that Contract 2 resembles a divergent shape with many self-intersections and then determine that Contract 2 is unstable or risky due to the divergent shape being associated with an ineffective negotiation process and the associated high-risk value. The geometric analysis generating instructions 112 may identify that Contract 3 resembles a straight-line shape and then determine that Contract 3 is stable and not at risk due to the straight-line shape being associated with progression in contract negotiations and the associated low risk value.

In step 510, it is determined whether the contract set is at risk by performing a geometric analysis of the time curve graph to identify geometric shapes that indicate a lack of convergence over a threshold amount of time. For example, the geometric analysis generating instructions 112 may perform a geometric analysis of the time curve graph that is received as input from the time curve graph generating instructions and determine whether the time curves of the time curve graph identify as certain geometric shapes. The administrator device 120 may specify geometric shapes that indicate a lack of convergence and the geometric generating instructions 112 may use the specified geometric shapes as input values to identify such geometric shapes in the time curve graph. The geometric shapes that indicate a lack of convergence may also be specified by default values in the geometric analysis generating instructions. The threshold amount of time value may be specified by a default value in the geometric analysis generating instructions 112 or may be input by the administrator device 120 and received by the geometric analysis generating instructions 112.

In step 512, in response to determining that the contract set is at risk, a notification indicating that the contract set is at risk is generated and displayed. For example, the server 102 generates alerts or notifications via the electronic notification generating instructions 110 and sends the alerts or notifications over the network 116 to the administrator device 120. In an embodiment, the alerts or notifications may prompt the buyer entities via the buyer computers 122, 124 to enter additional information.

In an embodiment, in response to determining that the contract set is not at risk, a notification indicating that the contract set is not at risk is generated and displayed.

In an embodiment, in response to identifying geometric shapes from the time curve graph that indicate that the contract set is at risk, a notification indicating that the contract set is at risk is generated and displayed. In an embodiment, in response to identifying geometric shapes from the time curve graph that indicate a lack of convergence over a threshold amount of time, a notification indicating that the contract set is at risk is generated and displayed.

In another embodiment, a first contract set is stored, the first contract set comprising two or more contract documents, the two or more contract documents comprising a template document and one or more contract document versions based on the template document. A second contract set is stored, the second contract set comprising two or more contract documents, the two or more contract documents comprising the template document and one or more contract document versions based on the template document. Digital contract metadata is stored, the digital contract metadata including data identifying one or more data fields in each contract document of the first and second contract sets, data specifying the data type of the one or more data fields in each contract document of the first and second contract sets, and weights assigned to each data type. A time curve graph is generated and displayed based on the contract set and contract metadata, the time curve graph graphically indicating similarities between contract documents in the first contract set, similarities between contract documents in the second contract set, and a temporal ordering of contract documents in each contract set of the first and second contract sets. It is determined whether the template document of the contract set needs to be modified by performing a geometric analysis of the time curve graph to identify a geometric trend between the first and second contract sets that indicate that the template document should be modified. In response to identifying a directional trend between the first and second contract sets that indicate that the template document should be modified, a notification indicating that the template document should be modified is generated and displayed at a computer associated with the contract administrator.

In an embodiment, identifying a geometric trend comprises identifying that two or more time curves of the time curve graph, wherein each time curve represents a different contract set, are within a threshold degree of similarity. For example, if the geometric analysis generating instructions 112 identify that an identified geometric shape of a time curve corresponding to the first contract set on the time curve graph is within a threshold degree of similarity to an identified geometric shape of a time curve corresponding to the second contract set on the time curve graph, it is determined that the template document needs to be modified. That is, if the geometric shapes corresponding to each contract set on the time curve graph are similar to each other, it may be indicative that the template document is ineffective, and thus, needs to be modified. Calculating similarity between geometric shapes on a time curve graph may be calculated by any available method known to those having ordinary skill in the art.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
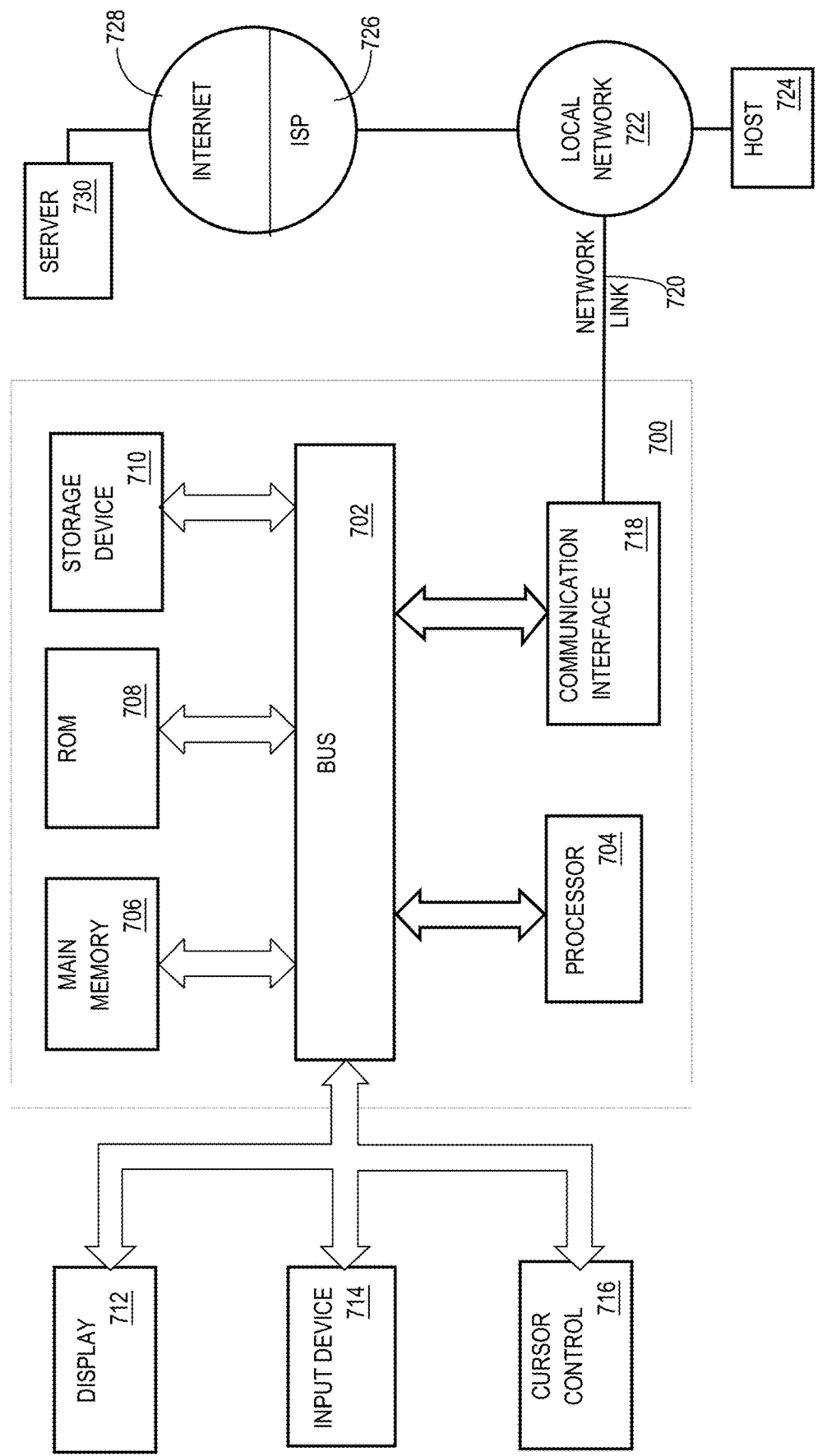
FIG. 7 illustrates an example computer system with which embodiments may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method comprising:
   storing, in one or more data repositories, digital data representing a contract set of two or more contract documents comprising a template document and one or more contract document versions based on the template document;
   storing, in the one or more data repositories, digital contract metadata, the digital contract metadata including data identifying one or more data fields in each contract document of the contract set, data specifying a data type of the one or more data fields in each contract document of the contract set, and weights assigned to each data type;
   identifying differences between data field values of the contract documents of the contract set;
   weighting the identified differences according to the weights assigned to each data type of the one or more data fields in each contract document of the contract set;
   using the weighted differences between the data field values of the contract documents of the contract set to calculate one or more distance scores for the one or more data fields;
   using the one or more distance scores calculated using the weighted differences between the data field values of the contract documents of the contract set and a temporal ordering of the contract documents in the contract set to generate and cause displaying, at a computer associated with a contract administrator, a time curve graph, the time curve graph including a geometric shape that graphically indicates one or more time curves between the contract documents of the contract set and a spatial proximity between the contact documents of the contract set;
   wherein a measure of each time curve of the one or more time curves in the time curve graph indicates an amount of time between a creation of two contract documents of the two or more contract documents, and the spatial proximity between the two or more contract document in the time curve graph indicates a metric of similarity between the two or more contract documents;
   performing a digital geometric analysis of the time curve graph to identify whether the geometric shape of the time curve graph indicates a lack of convergence over a threshold amount of time;
   in response to determining that the geometric shape indicates a lack of convergence over the threshold amount of time, generating and causing displaying, at the computer associated with the contract administrator, a notification indicating that the contract set is at risk.

2. The method of claim 1, wherein the digital contract metadata further includes temporal data indicating the temporal ordering of the contract documents in the contract set.

3. The method of claim 1, wherein the digital contract metadata further includes a contract clause library and data identifying a frequency of occurrence of each data type in each contract document of the contract set.

4. The method of claim 1, wherein calculating the one or more distance scores includes, for each distance score of the one or more distance scores, identifying differences between two contract documents of the contract set using natural language processing.

5. The method of claim 1, further comprising: in response to determining that the contract set is not at risk, generating and causing displaying, at the computer associated with the contract administrator, a notification indicating that the contract set is not at risk.

6. A computer-implemented method comprising:
storing, in one or more data repositories, digital data representing a first contract set of two or more contract documents, the two or more contract documents comprising a template document and one or more contract document versions based on the template document;
storing, in the one or more data repositories, digital data representing a second contract set of two or more contract documents, the two or more contract documents comprising the template document and one or more contract document versions based on the template document;
storing, in the one or more data repositories, digital contract metadata, the digital contract metadata including data regarding one or more data fields in each contract document of the first and second contract sets, data specifying a data type of the one or more data fields in each contract document of the first and second contract sets, and weights assigned to each data type;
identifying differences between data field values of the contract documents in the first and second contract sets;
weighting the identified differences according to the weights assigned to each data type;
using the weighted differences between the data field values to calculate one or more distance scores for the one or more data fields;
using the distance scores calculated using the weighted differences between the data field values to generate and cause displaying, at a computer associated with a contract administrator, a time curve graph, the time curve graph graphically indicating similarities between contract documents in the first contract set, similarities between contract documents in the second contract set, and a temporal ordering of the contract documents in each contract set of the first and second contract sets;
determining whether the template document needs to be modified by performing a geometric analysis of the time curve graph to identify a geometric trend between the first and second contract sets that indicate that the template document should be modified;
in response to identifying a directional trend between the first and second contract sets that indicate that the template document should be modified, generating and causing displaying, at the computer associated with the contract administrator, a notification indicating that the template document should be modified.

7. The method of claim 6, wherein the digital contract metadata further includes temporal data indicating the temporal ordering of the contract documents in the first and second contract sets.

8. The method of claim 6, wherein the digital contract metadata further includes a contract clause library and data identifying a frequency of occurrence of each data type in each contract document of the first and second contract sets.

9. The method of claim 6, wherein calculating the one or more distance scores includes, for each distance score of the one or more distance scores, identifying differences between two contract documents of the first and second contract sets using natural language processing.

10. A data processing system comprising:
one or more hardware processors;
a non-transitory computer-readable medium having instructions embodied thereon, the instructions, when executed by the one or more processors, cause:
storing, in one or more data repositories, digital data representing a contract set of two or more contract documents comprising a template document and one or more contract document versions based on the template document;
storing, in the one or more data repositories, digital contract metadata, the digital contract metadata including data identifying one or more data fields in each contract document of the contract set, data specifying a data type of the one or more data fields in each contract document of the contract set, and weights assigned to each data type;
identifying differences between data field values of the contract documents of the contract set;
weighting the identified differences according to the weights assigned to each data type of the one or more data fields in each contract document of the contract set;
using the weighted differences between the data field values of the contract documents of the contract set to calculate one or more distance scores for the one or more data fields;
using the one or more distance scores calculated using the weighted differences between the data field values of the contract documents of the contract set and a temporal ordering of the contract documents in the contract set to generate and cause displaying, at a computer associated with a contract administrator, a time curve graph, the time curve graph including a geometric shape that graphically indicates one or more time curves between contract documents of the contract set and a spatial proximity between contact documents of the contract set;
wherein a measure of each time curve of the one or more time curves in the time curve graph indicates an amount of time between a creation of two contract documents of the two or more contract documents, and the spatial proximity between the two or more contract documents in the time curve graph indicates a metric of similarity between the two or more contract documents;
performing a digital geometric analysis of the time curve graph to identify whether the geometric shape of the time curve graph indicates a lack of convergence over a threshold amount of time;
in response to determining that the geometric shape indicates the lack of convergence over the threshold amount of time, generating and causing displaying, at the computer associated with the contract administrator, a notification indicating that the contract set is at risk.

11. The system of claim 10, wherein the digital contract metadata further includes temporal data indicating the temporal ordering of the contract documents in the contract set.

12. The system of claim 10, wherein the digital contract metadata further includes a contract clause library and data identifying a frequency of occurrence of each data type in each contract document of the contract set.

13. The system of claim 10, wherein calculating the one or more distance scores includes, for each distance score of the one or more distance scores, identifying differences between two contract documents of the contract set using natural language processing.

14. The system of claim 10, further comprising instructions executed by the system which, when executed, cause: in response to determining that the contract set is not at risk, generating and causing displaying, at the computer associated with the contract administrator, a notification indicating that the contract set is not at risk.

* * * * *